US011724721B2

(12) United States Patent
Liu et al.

(10) Patent No.: US 11,724,721 B2
(45) Date of Patent: Aug. 15, 2023

(54) METHOD AND APPARATUS FOR DETECTING PEDESTRIAN

(71) Applicant: Apollo Intelligent Driving Technology (Beijing) Co., Ltd., Beijing (CN)

(72) Inventors: Xiang Liu, Beijing (CN); Bin Gao, Beijing (CN); Shuang Zhang, Beijing (CN); Xiaoxing Zhu, Beijing (CN); Jingjing Xue, Beijing (CN); Junping Wang, Beijing (CN); Chengfa Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 253 days.

(21) Appl. No.: 16/915,546

(22) Filed: Jun. 29, 2020

(65) Prior Publication Data
US 2021/0107531 A1    Apr. 15, 2021

(30) Foreign Application Priority Data
Oct. 11, 2019    (CN) .......................... 201910962343.9

(51) Int. Cl.
*B60W 60/00*    (2020.01)

(52) U.S. Cl.
CPC .. *B60W 60/00272* (2020.02); *B60W 60/0017* (2020.02); *B60W 2554/4029* (2020.02); *B60W 2554/4044* (2020.02)

(58) Field of Classification Search
CPC ....... B60W 60/00272; B60W 60/0017; B60W 2554/4029; B60W 2554/4044
See application file for complete search history.

(56) References Cited

U.S. PATENT DOCUMENTS 9,336,436 B1 * 5/2016 Dowdall ................ G06V 20/56
2020/0255030 A1 * 8/2020 Yamamoto ............. G01S 17/42

FOREIGN PATENT DOCUMENTS

| JP | 2012-145444 A |   | 8/2012 |
| JP | 2012145444 A | * | 8/2012 |
| JP | 2012-215555 A |   | 11/2012 |

OTHER PUBLICATIONS

S. Han, P. Ye, B. Zhu and H. Sun, "Pedestrian detection and tracking for mobile service robots," 2017 4th International Conference on Systems and Informatics (ICSAI), 2017, pp. 204-209, doi: 10.1109/ICSAI.2017.8248290. (Year: 2017).*

(Continued)

*Primary Examiner* — Aniss Chad
*Assistant Examiner* — Christine Nguyen Huynh
(74) *Attorney, Agent, or Firm* — Seed IP Law Group LLP

(57) ABSTRACT

A method, including: acquiring a point cloud frame including point cloud data of a pedestrian; projecting the point cloud data of the pedestrian to a ground coordinate system to obtain projection point data of the pedestrian; determining a direction of a connection line between the two shoulders of the pedestrian, based on a location distribution of the projection point data; extracting a point cloud of a stable region from the point cloud data of the pedestrian based on the direction of the connection line between the two shoulders of the pedestrian, a form change range of the stable region when the pedestrian moves being smaller than form change ranges of other regions of the pedestrian; and determining movement information of the pedestrian based on a coordinate of a center point of the point cloud of the stable region in a plurality of consecutive point cloud frames.

11 Claims, 6 Drawing Sheets

(56) References Cited

OTHER PUBLICATIONS

Chen et al., "SVM based People Counting Method in the Corridor Scene Using a Single-Layer Laser Scanner," 2016 IEEE 19$^{th}$ International Conference on Intelligent Transportation Systems (ITSC), Nov. 1-4, 2016, pp. 2632-2637.
Japanese Office Action for Japanese Application No. 2020-108726, dated Oct. 19, 2021, 4 pages.
Kurashima et al., "Object recognition that is strong in light and dark in deep learning based on three-dimensional information from LIDAR", 34th Robotics Society of Japan Academic Lecture, RSJ2016AC2V2-05 (Sep. 2016).

\* cited by examiner

METHOD AND APPARATUS FOR DETECTING PEDESTRIAN

CROSS-REFERENCE TO RELATED APPLICATIONS

This application claims priority to Chinese Patent Application No. 201910962343.9, filed on Oct. 11, 2019, titled "Method and Apparatus for Detecting Pedestrian," which is hereby incorporated by reference in its entirety.

TECHNICAL FIELD

Embodiments of the present disclosure relate to the field of computer technology, specifically to the technical field of autonomous driving technology, and more specifically to a method and apparatus for detecting a pedestrian.

BACKGROUND

In an autonomous driving scenario, an on-vehicle laser radar is usually used to sense a road environment. Other participants in the road environment mainly include vehicles and pedestrians. Typically, vehicles have stable structures, and their shapes do not change with movement trajectories, and their driving routes are usually routes along the direction of the lane line. However, pedestrians often sway in their postures while walking, and thus they have strong walking arbitrariness. Improving the accuracy of pedestrian movement status detection can effectively guarantee the driving safety of autonomous driving vehicles.

SUMMARY

Embodiments of the present disclosure propose a method and apparatus for detecting a pedestrian, an electronic device and a computer readable medium.

In a first aspect, an embodiment of the present disclosure provides a method for detecting a pedestrian, the method comprising: acquiring a point cloud frame including point cloud data of a pedestrian; projecting the point cloud data of the pedestrian to a ground coordinate system to obtain projection point data of the pedestrian; determining a direction of a connection line between the two shoulders of the pedestrian, based on a location distribution of the projection point data; extracting, based on the determined direction, a point cloud of a stable region of the pedestrian from the point cloud data of the pedestrian, wherein a morphological change range of the stable region when the pedestrian moves is smaller than morphological change ranges of other regions of the pedestrian; and determining movement information of the pedestrian based on a coordinate of a center point of the point cloud of the stable region in a plurality of consecutive point cloud frames.

In some embodiments, determining a direction of a connection line between the two shoulders of the pedestrian, based on a location distribution of the projection point data, comprises: determining a center point of the projection point data of the pedestrian; constructing a distance matrix based on a distance between each projection point and the determined center point; determining, based on the distance matrix, a direction having a largest variance change rate of the distance between each projection point and the determined center point, and determining the direction of the connection line between the two shoulders of the pedestrian, based on the determined direction having the largest variance change rate of the distance.

In some embodiments, constructing a distance matrix based on a distance between each projection point and the center point of the projection point data, comprises: normalizing the distance between each projection point and the center point of the projection point data, and constructing the distance matrix based on the normalized distance.

In some embodiments, determining the direction of the connection line between the two shoulders of the pedestrian, based on the determined direction having the largest variance change rate of the distance, comprises: determining the direction having the largest variance change rate of the distance between each projection point and the center point of the projection point data as a first direction, and determining, based on the first direction, a direction having a smallest variance change rate of the distance between each projection point and the center point of the projection point data as a second direction; determining, in response to determining that a difference between a variance of the distance between each projection point and the center point of the projection point data in the first direction and a variance of the distance between each projection point and the center point of the projection point data in the second direction is greater than a preset variance threshold, that the first direction is the direction of the connection line between the two shoulders of the pedestrian.

In some embodiments, extracting, based on the determined direction, a point cloud of a stable region from the point cloud data of the pedestrian, comprises: filtering out a three-dimensional data point from the point cloud of the pedestrian to obtain the point cloud of the stable region of the pedestrian, wherein the three-dimensional data point corresponds to a projection point, a distance of which to the center point of the projection point data in the direction of the connection line between the two shoulders of the pedestrian exceeds a preset distance threshold.

In a second aspect, an embodiment of the present disclosure provides an apparatus for detecting a pedestrian, the apparatus comprising: an acquisition unit, configured to acquire a point cloud frame including point cloud data of a pedestrian; a projection unit, configured to project the point cloud data of the pedestrian to a ground coordinate system to obtain projection point data of the pedestrian; a first determining unit, configured to determine a direction of a connection line between the two shoulders of the pedestrian, based on a location distribution of the projection point data; an extraction unit, configured to extract a point cloud of a stable region from the point cloud data of the pedestrian based on the direction of the connection line between the two shoulders of the pedestrian, a form change range of the stable region when the pedestrian moves being smaller than form change ranges of other regions of the pedestrian; and a second determining unit, configured to determine movement information of the pedestrian based on a coordinate of a center point of the point cloud of the stable region in a plurality of consecutive point cloud frames.

In some embodiments, the first determining unit is further configured to determine a direction of a connection line between the two shoulders of the pedestrian by: determining a center point of the projection point data of the pedestrian, and constructing a distance matrix based on a distance between each projection point and the center point of the projection point data; and determining, based on the distance matrix, a direction having a largest variance change rate of the distance between each projection point and the center point of the projection point data, and determining the direction of the connection line between the two shoulders of the pedestrian, based on the direction having the largest variance change rate of the distance between each projection point and the center point of the projection point data.

In some embodiments, the first determining unit is further configured to construct a distance matrix by: normalizing the distance between each projection point and the center point of the projection point data, and constructing the distance matrix based on the normalized distance.

In some embodiments, the first determining unit is further configured to determine the direction of the connection line between the two shoulders of the pedestrian by: determining the direction having the largest variance change rate of the distance between each projection point and the center point of the projection point data as a first direction, determining, based on the first direction, a direction having a smallest variance change rate of the distance between each projection point and the center point of the projection point data as a second direction; determining, in response to determining that a difference between a variance of the distance between each projection point and the center point of the projection point data in the first direction and a variance of the distance between each projection point and the center point of the projection point data in the second direction is greater than a preset variance threshold, that the first direction is the direction of the connection line between the two shoulders of the pedestrian.

In some embodiments, the extraction unit is further configured to extract a point cloud of a stable region by: filtering out a three-dimensional data point from the point cloud of the pedestrian to obtain the point cloud of the stable region of the pedestrian, wherein the three-dimensional data point corresponds to a projection point, a distance of which to the center point of the projection point data in the direction of the connection line between the two shoulders of the pedestrian exceeds a preset distance threshold.

In a third aspect, an embodiment of the present disclosure provides an electronic device, the device comprising: one or more processors; and a storage apparatus, for storing one or more programs, the one or more programs, when executed by the one or more processors, cause the one or processors to implement the method according to the first aspect.

In a fourth aspect, an embodiment of the present disclosure provides a computer readable medium, storing a computer program thereon, the program, when executed by a processor, implement the method for detecting a pedestrian according to the first aspect.

According to the method and apparatus for detecting a pedestrian, electronic device and computer readable medium of the above embodiments of the present disclosure, a point cloud frame including point cloud data of a pedestrian is first acquired; then the point cloud data of the pedestrian is projected to a ground coordinate system to obtain projection point data of the pedestrian; a direction of a connection line between the two shoulders of the pedestrian is determined based on a location distribution of the projection point data; next, it extracts a point cloud of a stable region from the point cloud data of the pedestrian based on the direction of the connection line between the two shoulders of the pedestrian, wherein a morphological change range of the stable region when the pedestrian moves is smaller than morphological change ranges of other regions of the pedestrian; and movement information of the pedestrian is finally determined based on a coordinate of a center point of the point cloud of the stable region in a plurality of consecutive point cloud frames, which reduces the influence of body posture changes on pedestrian movement detection accuracy during pedestrian walking, realizes accurate detection of pedestrian movement status.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
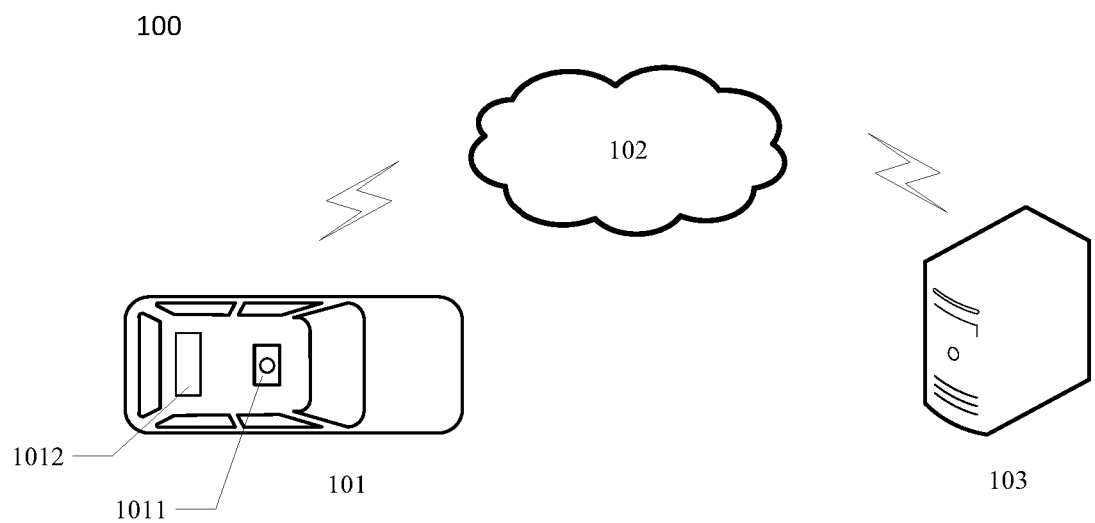
FIG. 1 is a diagram of an exemplary system architecture in which embodiments of the present disclosure may be implemented.

FIG. 1 illustrates an exemplary system architecture 100 in which a method for detecting a pedestrian or an apparatus for detecting a pedestrian of the present disclosure may be implemented.

As shown in FIG. 1, the system architecture 100 may include an autonomous driving vehicle 101, a network 102, and a server 103. The network 102 is used to provide a communication link medium between the autonomous driving vehicle 101 and the server 103. The network 102 may include various types of connections, such as wired, wireless communication links, or optic fibers.

The autonomous driving vehicle 101 may be provided with a laser radar 1011, which is used to acquire point cloud data of the surrounding environment of the autonomous driving vehicle. The autonomous driving vehicle 101 may also be provided with a processing unit 1012 for processing data sensed by the autonomous driving vehicle 101, making driving decisions, and so on.

The autonomous driving vehicle 101 may interact with the server 103 through the network 102 to send data to or receive data from the server 103. The server 103 may be a server that provides backend support for the autonomous driving vehicle 101, and may analyze and process environmental data sensed by the autonomous driving vehicle 101, and feed back an analysis processing result to the autonomous driving vehicle.

In an application scenario of the present disclosure, the autonomous driving vehicle 101 may send data point cloud data acquired by the laser radar 1011 to the server 103 through the processing unit 1012, and the server 103 may perform obstacle detection and recognition based on the received data point cloud data, and return detection and recognition results to the autonomous driving vehicle 101. The autonomous driving vehicle 101 makes driving decisions based on the obstacle detection and recognition results. Alternatively, the server 103 may also make driving decisions based on the obstacle detection and recognition results, and feedback decision instructions to the autonomous driving vehicle 101.

It should be noted that the server 103 may be hardware or software. When the server 103 is hardware, it may be implemented as a distributed server cluster composed of a plurality of servers or as a single server. When the server 103 is software, it may be implemented as a plurality of software or software modules (for example, a plurality of software or software modules used to provide distributed services) or as a single software or software module, which is not specifically limited herein.

The method for detecting a pedestrian provided by the embodiments of the present disclosure may be performed by the server 103, and accordingly, the apparatus for detecting a pedestrian may be provided in the server 103.

Alternatively, the method for detecting a pedestrian provided by the embodiments of the present disclosure may also be performed by the processing unit 1012 on the autonomous driving vehicle 101, and accordingly, the apparatus for detecting a pedestrian may be provided in the processing unit 1012 on the autonomous driving vehicle 101.

It should be understood that the number of autonomous driving vehicles, networks, servers, laser radars and processing units in FIG. 1 is merely illustrative. Depending on the implementation needs, there may be any number of autonomous driving vehicles, networks, servers, laser radars and processing units.

Figure 2:
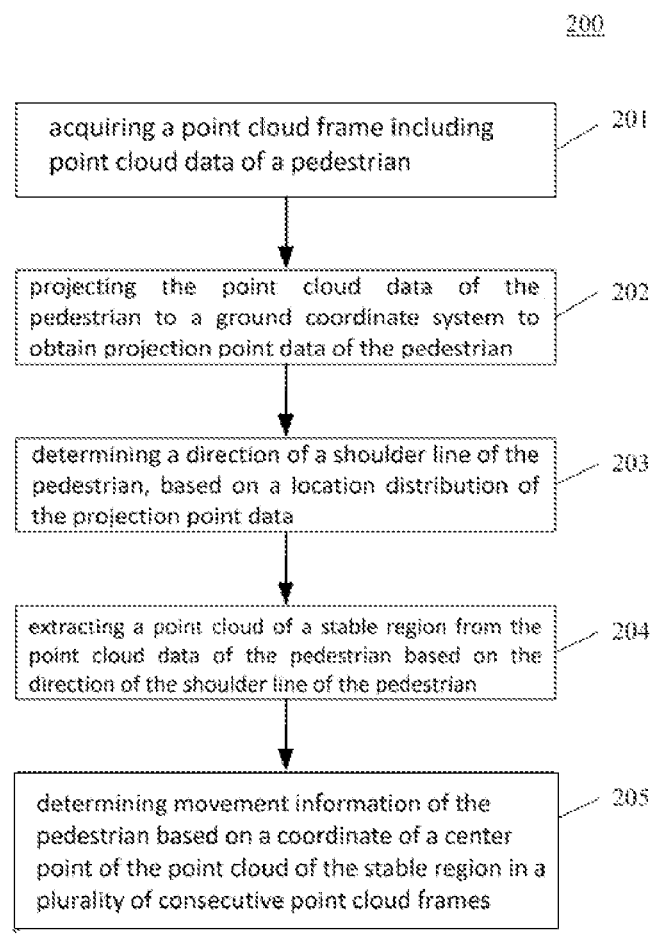
FIG. 2 is a flowchart of an embodiment of a method for detecting a pedestrian according to the present disclosure.

With further reference to FIG. 2, a flow 200 of an embodiment of a method for detecting a pedestrian according to the present disclosure is illustrated. The method for detecting a pedestrian includes the following steps:

Step 201, a point cloud frame including point cloud data of a pedestrian is acquired.

In the present embodiment, an executing body of the method for detecting a pedestrian may first acquire a road point cloud frame acquired by an on-vehicle laser radar. The road point cloud frame is a frame of point cloud in a point cloud sequence obtained by the on-vehicle laser radar acquiring a laser reflection value of a road environment. Typically, the on-vehicle laser radar scans the surrounding environment according to a certain frequency, and each scan period forms a point cloud frame. During the driving process of an autonomous driving vehicle, the on-vehicle laser radar may periodically emit laser light and receive reflection information to sequentially generate a plurality of road point cloud frames.

The executing body may be directly connected to the on-vehicle laser radar to acquire the point cloud frame acquired by the laser radar in real time, or may acquire a point cloud frame in a stored road point cloud sequence from other devices or storage units.

Then, the acquired road point cloud frame may be analyzed to determine whether the point cloud data of the pedestrian are included, so as to acquire the point cloud frame including the point cloud data of the pedestrian. Generally, the road environment is very complicated. The acquired laser point cloud data include data points of traffic signs such as lane lines, road signs, speed limit signs, or traffic lights, and also include data points of other traffic participants, such as pedestrians or vehicles. In the present embodiment, three-dimensional data points in the road point cloud frame may be clustered and segmented, and then feature extraction of each segmented region may be performed to identify whether the region contains a point cloud representing the contour of the pedestrian, that is, the point cloud data of the pedestrian. Here, extracted features may be matched based on geometric features of the pedestrian, thereby identifying the point cloud data of the pedestrian.

Alternatively, a method based on deep learning may also be used to identify whether the point cloud data of the pedestrian are included in the road point cloud frame. For example, a trained deep neural network may be used to classify objects in the road point cloud frame to identify the point cloud data of pedestrian.

The executing body may also directly acquire the point cloud frame containing the point cloud data of the pedestrian from other electronic devices or databases. For example, other electronic devices may first perform preliminary pedestrian recognition on three-dimensional point cloud data acquired by the on-vehicle laser radar, and then mark the point cloud frame containing the point cloud data of the pedestrian. The executing body may be connected with other electronic devices to obtain the point cloud frame containing the point cloud data of the pedestrian.

Step 202, the point cloud data of the pedestrian is projected to a ground coordinate system to obtain projection point data of the pedestrian.

In the present embodiment, the point cloud data of the pedestrian may be extracted from the point cloud frame, for example, a point cloud cluster representing the pedestrian obtained by clustering may be cut out from the point cloud frame. Then, three-dimensional point cloud data of the pedestrian is projected to the ground coordinate system, that is, three-dimensional coordinates of each data point in the point cloud data of the pedestrian are converted into two-dimensional coordinates to obtain the projection point data of the pedestrian. Each two-dimensional projection point in the projection point data corresponds to each three-dimensional data point in the above point cloud data of the pedestrian.

In practice, the three-dimensional coordinates of the point cloud data of the pedestrian usually use the world coordinate system XYZ, and Z-axis coordinates in the three-dimensional coordinates may be directly removed to obtain projection data points projected to the ground coordinate system.

Step 203, a direction of a shoulder line of the pedestrian is determined based on a location distribution of the projection point data.

Figure 3:
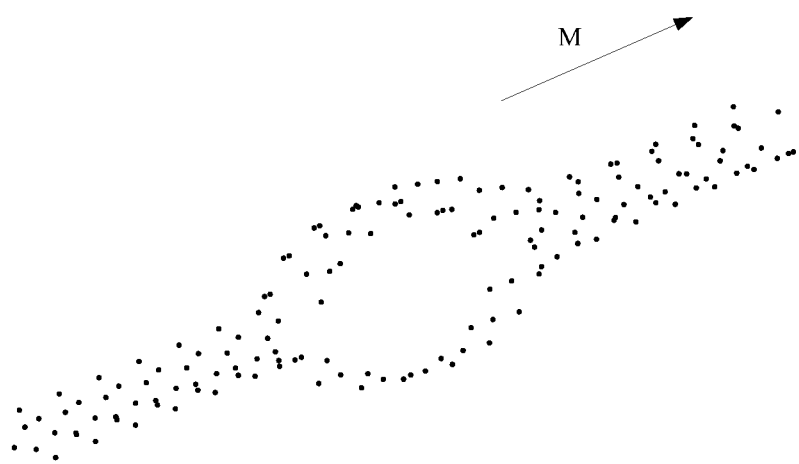
FIG. 3 is a schematic diagram of distribution of pedestrian projection point data.

Based on contour characteristics of the human body, in addition to data points representing the head, the projection data points of the pedestrian are distributed in a narrow interval along the shoulder line. FIG. 3 shows an exemplary schematic diagram of the projection data points of the pedestrian, where direction M is the direction of the shoulder line (i.e., a connection line between the two shoulders).

In the present embodiment, the direction of the shoulder line of the pedestrian may be determined by statistically analyzing the location distribution of the projection point data of the pedestrian.

In some alternative implementations, the projection point data of the pedestrian may be down-sampled, to find a straight line by fitting or iterating sampled data points obtained by the down-sampling, so that the sum or variance of the distance between the sampled data points and the straight line is minimized. For example, for the sampled data points obtained by down-sampling, first randomly selecting the connecting line between two sampled data points as an initial estimated straight line, then selecting a new estimated data point, and adjusting the direction of the straight line based on the newly added data point so that the sum of the distances of all the sampled data points added to the line is minimized, then adding new sampled data points in sequence and adjusting the direction of the straight line. After all the sampled data points are added to the calculation, the direction of the adjusted straight line is the direction of the fitted shoulder line.

Step 204, a point cloud of a stable region is extracted from the point cloud data of the pedestrian based on the direction of the shoulder line of the pedestrian.

Here, a form change range of the stable region when the pedestrian moves is smaller than form morphological change ranges of other regions of the pedestrian. In the present embodiment, a part of the human body having a form change range during walking smaller than a preset range may be used as the stable region. It may be understood that, in various parts of the human body, the postures of the head, shoulders, and main torso change in a smaller range, while the postures of the limbs change in a larger range. The head, shoulders, and main torso may be used as the stable regions, and the point clouds of these stable regions are extracted.

In the projection point data of the pedestrian, there is a significant distribution difference at the boundary between the head region and the shoulder region. Projection points representing the head region in the projection point data may be extracted based on prior knowledge of differences in projection point distribution. Then, starting from the edge of the head region, projection points within a preset distance from the head region edge is taken outward along the direction of the shoulder line as the projection points of the extracted stable region. The preset distance may be set based on statistical data of the head width and shoulder width of the human body, for example, the head width may be calculated based on the projection points of the head region in the projection data points, and set within a range satisfying the following conditions: head width/(head width+2× preset distance)<head-to-shoulder width ratio in human body statistics data. In this way, it may ensure that the projection point data of the arms may not be completely included in the extracted stable region. Then, the projection points of the stable region are mapped to the point cloud data of the pedestrian to obtain the point cloud of the stable region.

In some alternative implementations of the present embodiment, a three-dimensional data point corresponding to a projection point having a distance to the center point of the projection point data in the direction of the shoulder line of the pedestrian exceeds a preset distance threshold may be filtered out from the point cloud of the pedestrian, to obtain the point cloud of the stable region of the pedestrian. The preset distance threshold may be a value that does not exceed a statistically obtained lateral distance between the arms and the head center.

Specifically, in the alternative implementations, the coordinates of the center point of the projection point data may be determined first, and then the distance between each projection point and the center point of the projection point data along the direction of the shoulder line of the pedestrian may be calculated to determine whether the distance between each projection point and the center point of the projection point data along the direction of the shoulder line of the pedestrian is greater than the preset distance threshold. If yes, the three-dimensional data point corresponding to the projection point is filtered out; otherwise, the three-dimensional data point corresponding to the projection point is kept. In this way, it may filter out data points of body parts that are far away from the center point in the direction of the shoulder line, such as arms or hands that are far away from the center point.

Further, alternatively, for each projection point of the pedestrian, the distance of the projection point in the direction perpendicular to the direction of the shoulder line may also be calculated, if the distance exceeds a preset threshold corresponding to the direction perpendicular to the direction of the shoulder line, the three-dimensional data point corresponding to the projection point in the point cloud of the pedestrian may also be filtered out. In this way, point cloud data of the legs and feet may be further filtered out, so that the extracted stable region is more accurate.

Step 205, movement information of the pedestrian is determined based on a coordinate of a center point of the point cloud of the stable region in a plurality of consecutive point cloud frames.

For each point cloud frame, the coordinates of the extracted center point of the point cloud of the stable region of the pedestrian may be calculated as location coordinates of the pedestrian at the time of acquiring the corresponding point cloud frame. The coordinates of all points in the stable region may be averaged to obtain the coordinates of the average point as the coordinates of the center point; alternatively, after the coordinates of all the points are averaged to obtain the coordinates of the average point, the point closest to the average point in the stable region may be used as the center point, and the coordinates of the point closest to the average point are used as the coordinates of the average point.

The movement information may include a movement direction and/or a movement trajectory. The center point coordinates of the stable region of the pedestrian in each point cloud frame may be used as the pedestrian's location coordinates, and the pedestrian's location change direction may be determined based on the pedestrian's location coordinates in a plurality of consecutive frames, thereby determining the movement direction of the pedestrian. Alternatively, the acquisition time of each frame in the plurality of consecutive point cloud frames may be acquired, and the center point coordinates of the stable region of the pedestrian in each frame may be correlated with the corresponding acquisition time to form the movement trajectory of the pedestrian.

The movement information may also include a moving speed. The moving speed of the center point of the stable region may be calculated as the moving speed of the pedestrian based on a moving distance of the center point of the stable region of the pedestrian in the point cloud frame and the acquisition time of each point cloud frame. Here, the acquisition time of each point cloud frame may be acquired from raw data acquired by the laser radar, and the moving distance of the center point may be calculated based on the coordinates of the center point in the corresponding frame.

The method for detecting a pedestrian of the above embodiment of the present disclosure, first acquiring a point cloud frame including point cloud data of a pedestrian; then projecting the point cloud data of the pedestrian to a ground coordinate system to obtain projection point data of the pedestrian; determining a direction of a shoulder line of the pedestrian, based on a location distribution of the projection point data; next extracting a point cloud of a stable region from the point cloud data of the pedestrian based on the direction of the shoulder line of the pedestrian, a form change range of the stable region when the pedestrian moves being smaller than form morphological change ranges of other regions of the pedestrian; and finally determining movement information of the pedestrian based on a coordinate of a center point of the point cloud of the stable region in a plurality of consecutive point cloud frames, which reduces the influence of body posture changes on pedestrian movement detection accuracy during pedestrian walking, realizes accurate detection of pedestrian movement status.

Figure 4:
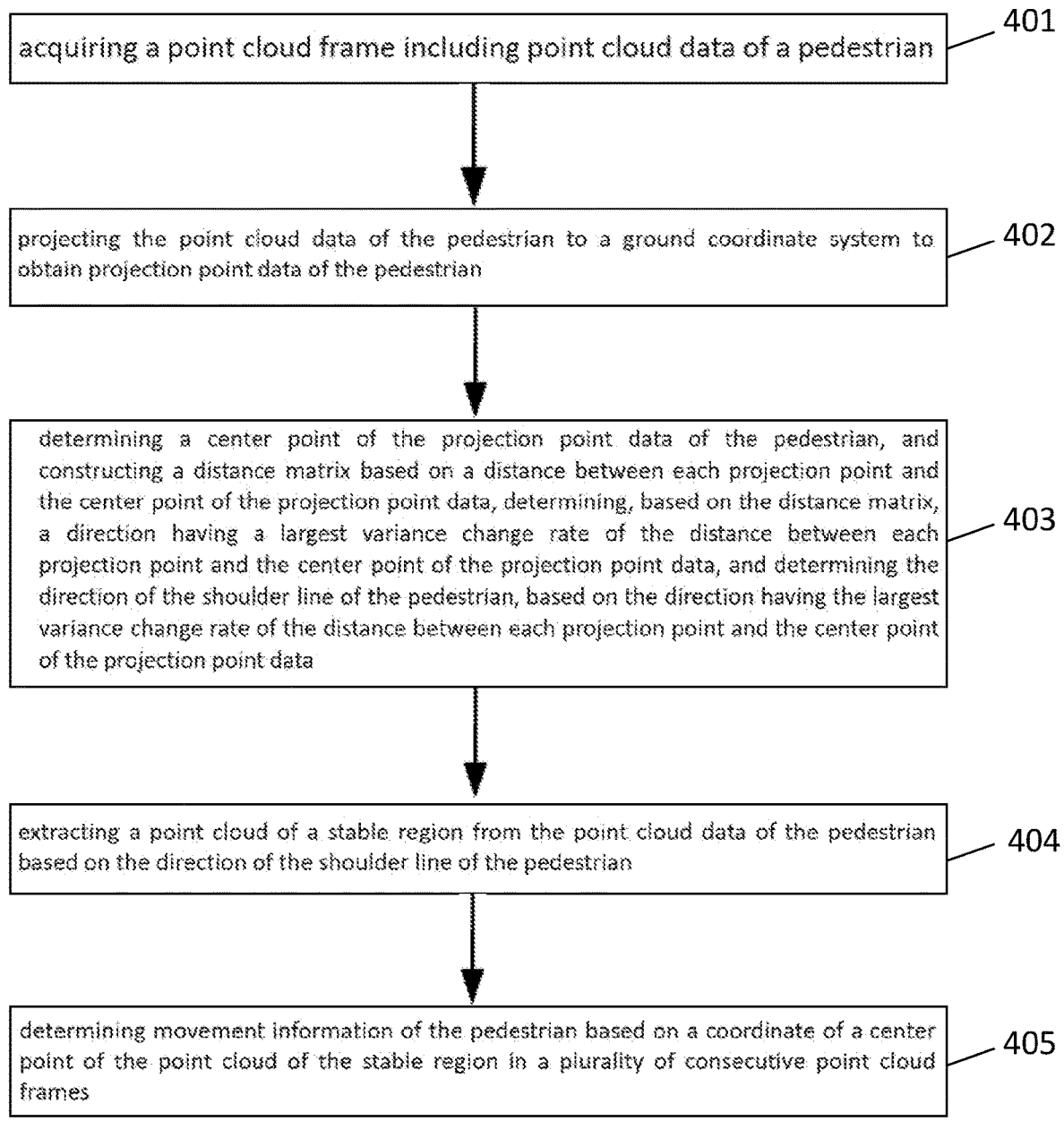
FIG. 4 is a flowchart of another embodiment of the method for detecting a pedestrian according to the present disclosure.

With further reference to FIG. 4, a schematic flowchart of another embodiment of the method for detecting a pedestrian according to the present disclosure is illustrated. As shown in FIG. 4, a flow 400 of the method for detecting a pedestrian of the present embodiment includes the following steps:

Step 401, a point cloud frame including point cloud data of a pedestrian is acquired.

Step 402, the point cloud data of the pedestrian is projected to a ground coordinate system to obtain projection point data of the pedestrian.

In the present embodiment, step 401 and step 402 are the same as step 201 and step 202 of the foregoing embodiment respectively, and for the specific implementation of step 401 and step 402, reference may be made to the description of step 201 and step 202 in the foregoing embodiment respectively, and detailed description thereof will be omitted.

Step 403, determining a center point of the projection point data of the pedestrian, and constructs a distance matrix based on a distance between each projection point and the center point of the projection point data, determining, based on the distance matrix, a direction having a largest variance change rate of the distance between each projection point and the center point of the projection point data, and determining the direction of the shoulder line of the pedestrian, based on the direction having the largest variance change rate of the distance between each projection point and the center point of the projection point data.

In the present embodiment, the coordinates of the center point of the projection point data may be calculated first based on the coordinates of the projection point data of the pedestrian, and then the distance between each projection point in the projection point data and the center point of the projection point data may be calculated. Specifically, the distance between each projection point and the center point of the projection point data along the X-axis and Y-axis directions in the ground coordinate system may be calculated separately, and then the distance matrix is constructed based on the calculated distance between each projection point and the center point of the projection point data. Each element in the distance matrix represents the distance between a projection point and the center point of the projection point data.

Next, an SVD (Singular Value Decomposition) method may be used to decompose distance matrix A into $A=U \times \Sigma \times V^T$, where $\Sigma$ is a diagonal matrix, U, V are both matrices formed by a set of orthogonal basis vectors. According to the matrix U obtained by the decomposition, the direction having the largest variance change rate of the distance between each projection point and the center point of the projection point data is determined. Specifically, U is formed by two orthogonal basis vectors, where the direction of one of the basis vectors is the direction having the largest variance change rate of the distance between each projection point and the center point of the projection point data; and the direction of the other basis vector is perpendicular to the direction having the largest variance change rate of the distance between each projection point and the center point of the projection point data.

Alternatively, a PCA (Principal Component Analysis) method may be used to find a set of orthogonal axes in the coordinate system where the projection point data is located, so that the distance between each projection point and the center point of the projection point data has the largest variance change rate along one axis of the orthogonal axis, and the smallest variance change rate along the other axis of the orthogonal axis.

Alternatively, after calculating the distance between each projection point and the center point of the projection point data, the distance between each projection point and the center point of the projection point data may be normalized to normalize the distance to the interval of [0, 1], and the distance matrix is constructed based on the normalized distance. In this way, it is possible to further reduce the amount of data calculation and speed up the searching of the direction having the largest variance change rate of the distance between each projection point and the center point of the projection point data.

Alternatively, the direction of the shoulder line of the pedestrian may be determined according to the approaches as follows: determining the direction having the largest variance change rate of the distance between each projection point and the center point of the projection point data as a first direction, and determining a direction having a smallest variance change rate of the distance between each projection point and the center point of the projection point data as a second direction based on the first direction; and determining, in response to determining that a difference between a variance of the distance between each projection point and the center point of the projection point data in the first direction and a variance of the distance between each projection point and the center point of the projection point data in the second direction is greater than a preset variance threshold, that the first direction is the direction of the shoulder line of the pedestrian.

Here, the variance $\sigma1$ of the distance between each projection point and the center point of the projection point data in the first direction and the variance $\sigma2$ between each projection point and the center point of the projection point data in the second direction may be calculated, if $\sigma1 \gg \sigma2$, that is, $\sigma1-\sigma2>$variance threshold, it may be determined that the first direction is the direction of the shoulder line. If $\sigma1$ and $\sigma2$ do not satisfy $\sigma1-\sigma2>$variance threshold, distance variance analysis may be performed based on the distance matrix again, or the angle of the first direction may be adjusted, until the variance $\sigma1$ of the distance between each projection point and the center point of the projection point data in the first direction and the variance $\sigma2$ between each projection point and the center point of the projection point data in the second direction satisfy $\sigma1-\sigma2>$variance threshold, and the adjusted first direction is determined as the direction of the shoulder line. This implementation may further improve the determined shoulder line direction to be consistent with the actual human shoulder line direction, and avoid the increase in the dispersion of the point cloud when the limbs swing during walking, which leads to an inaccuracy of the determined shoulder line direction.

Step 404, extracting a point cloud of a stable region from the point cloud data of the pedestrian based on the direction of the shoulder line of the pedestrian.

Step 405, determining movement information of the pedestrian based on a coordinate of a center point of the point cloud of the stable region in a plurality of consecutive point cloud frame.

In the present embodiment, step 404 and step 405 are the same as step 204 and step 205 of the foregoing embodiment respectively, and for the specific implementation of step 404 and step 405, reference may be made to the description of step 204 and step 205 in the foregoing embodiment respectively, and detailed description thereof will be omitted.

In the flow 400 of the method for detecting a pedestrian in the present embodiment, a distance matrix is constructed based on the distance between each projection point and the center point of the projection point data, and the distance matrix is used to find the direction having the largest variance change rate of the distance between each projection point and the center point of the projection point data as the direction of the shoulder line, which can more accurately fit the direction of the shoulder line, thereby helping to extract a more reliable point cloud of the stable region, and thus improving the accuracy of pedestrian movement status detection.

Figure 5:
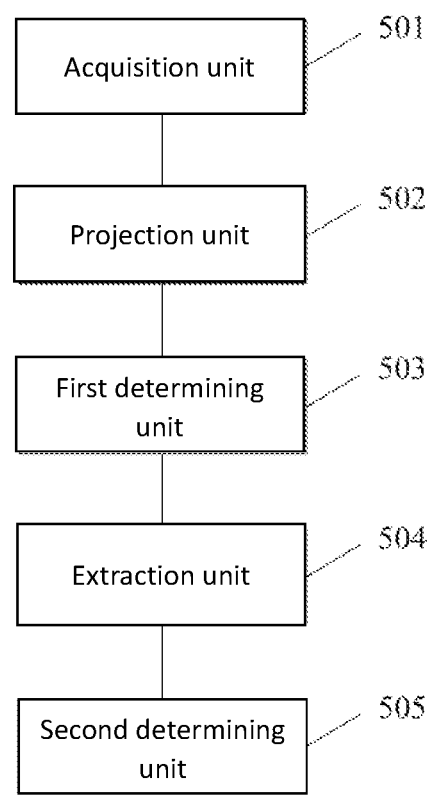
FIG. 5 is a schematic structural diagram of an embodiment of an apparatus for detecting a pedestrian according to the present disclosure.

With further reference to FIG. 5, as an implementation of the method shown in the above figures, the present disclosure provides an embodiment of an apparatus for detecting a pedestrian, and the apparatus embodiment corresponds to the method embodiment as shown in FIGS. 2 and 4. The apparatus may be specifically applied to various electronic devices.

As shown in FIG. 5, an apparatus 500 for detecting a pedestrian of the present embodiment includes: an acquisition unit 501, a projection unit 502, a first determining unit 503, an extraction unit 504 and a second determining unit 505. The acquisition unit 501 is configured to acquire a point cloud frame including point cloud data of a pedestrian. The projection unit 502 is configured to project the point cloud data of the pedestrian to a ground coordinate system to obtain projection point data of the pedestrian. The first determining unit 503 is configured to determine a direction of a shoulder line of the pedestrian, based on a location distribution of the projection point data. The extraction unit 504 is configured to extract a point cloud of a stable region from the point cloud data of the pedestrian based on the direction of the shoulder line of the pedestrian, a form change range of the stable region when the pedestrian moves being smaller than form morphological change ranges of other regions of the pedestrian. The second determining unit 505 is configured to determine movement information of the pedestrian based on a coordinate of a center point of the point cloud of the stable region in a plurality of consecutive point cloud frames.

In some embodiments, the first determining unit 503 is further configured to determine a direction of a shoulder line of the pedestrian according to approaches as follows: determining a center point of the projection point data of the pedestrian, and constructing a distance matrix based on a distance between each projection point and the center point of the projection point data; and determining, based on the distance matrix, a direction having a largest variance change rate of the distance between each projection point and the center point of the projection point data, and determining the direction of the shoulder line of the pedestrian, based on the direction having the largest variance change rate of the distance between each projection point and the center point of the projection point data.

In some embodiments, the first determining unit 503 is further configured to construct a distance matrix according to an approach as follows: normalizing the distance between each projection point and the center point of the projection point data, and constructing the distance matrix based on the normalized distance.

In some embodiments, the first determining unit 503 is further configured to determine the direction of the shoulder line of the pedestrian according to approaches as follows: determining the direction having the largest variance change rate of the distance between each projection point and the center point of the projection point data as a first direction, and determining a direction having a smallest variance change rate of the distance between each projection point and the center point of the projection point data as a second direction based on the first direction; and determining, in response to determining that a difference between a variance of the distance between each projection point and the center point of the projection point data in the first direction and a variance of the distance between each projection point and the center point of the projection point data in the second direction is greater than a preset variance threshold, that the first direction is the direction of the shoulder line of the pedestrian.

In some embodiments, the extraction unit 504 is further configured to extract a point cloud of a stable region according to an approach as follows: filtering out a three-dimensional data point corresponding to a projection point having a distance to the center point of the projection point data in the direction of the shoulder line of the pedestrian exceeds a preset distance threshold, from the point cloud of the pedestrian, to obtain the point cloud of the stable region of the pedestrian.

It should be understood that the units recorded in the apparatus 500 correspond to the various steps in the method described with reference to FIGS. 2 and 4. Therefore, the operations and features described by the method of generating a model are also applicable to the apparatus 500 and the units included therein, and detailed description thereof will be omitted.

The apparatus 500 for detecting a pedestrian of the above embodiment of the present disclosure, by acquiring a point cloud frame including point cloud data of a pedestrian; then projecting the point cloud data of the pedestrian to a ground coordinate system to obtain projection point data of the pedestrian; determining a direction of a shoulder line of the pedestrian, based on a location distribution of the projection point data; next extracting a point cloud of a stable region from the point cloud data of the pedestrian based on the direction of the shoulder line of the pedestrian, a form change range of the stable region when the pedestrian moves being smaller than form morphological change ranges of other regions of the pedestrian; and finally determining movement information of the pedestrian based on a coordinate of a center point of the point cloud of the stable region in a plurality of consecutive point cloud frames, which reduces the influence of body posture changes on pedestrian movement detection accuracy during pedestrian walking, realizes accurate detection of pedestrian movement status.

Figure 6:
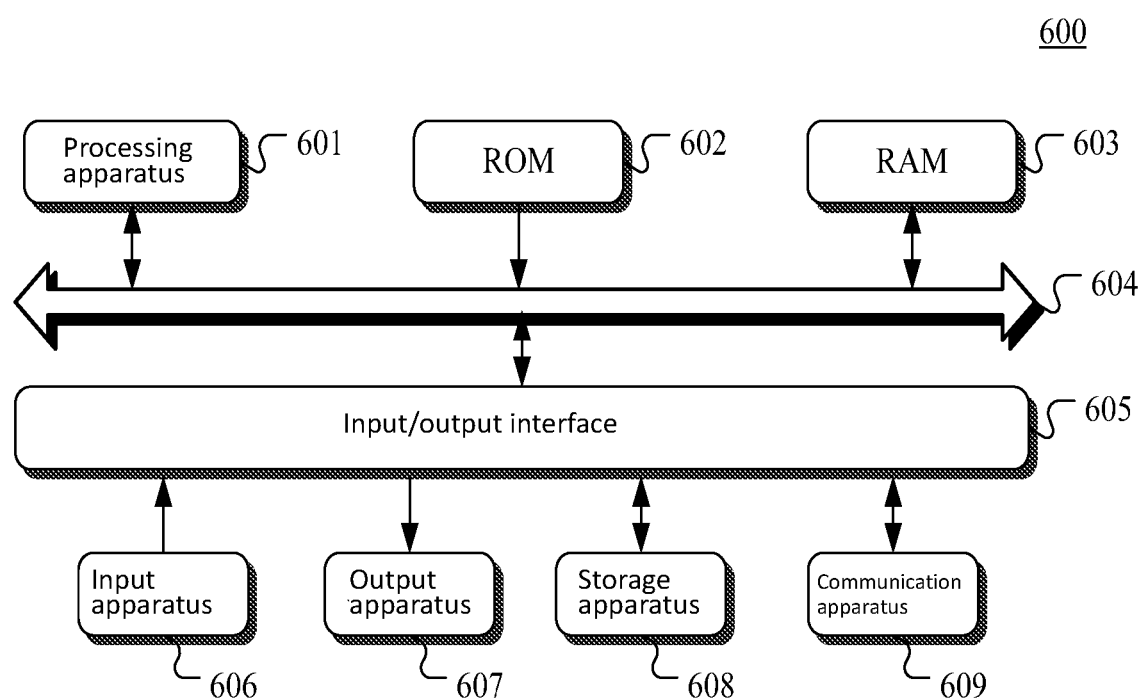
FIG. 6 is a schematic structural diagram of a computer system of an electronic device adapted to implement the embodiments of the present disclosure.

With further reference to FIG. 6, a schematic structural diagram of an electronic device 600 (for example, the server shown in FIG. 1) adapted to implement the embodiments of the present disclosure is illustrated. The electronic device shown in FIG. 6 is merely an example and should not impose any limitation on the function and scope of use of the embodiments of the present disclosure.

As shown in FIG. 6, the electronic device 600 may include a processing apparatus (for example, a central processor, a graphics processor, etc.) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses may be connected to the I/O interface 605: an input apparatus 606, including such as a touch screen, a touch pad, a keyboard, a mouse, a camera, a microphone, an accelerometer, or a gyroscope; an output apparatus 607 including such as a liquid crystal display (LCD), a speaker, or a vibrator; the storage apparatus 608 including such as a magnetic tape, or a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all the apparatuses shown. More or fewer apparatuses may be implemented or provided instead. Each block shown in FIG. 6 may represent one apparatus, and may also represent a plurality of apparatuses as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 609, or from the storage apparatus 608, or from the ROM 602. The computer program, when executed by the processing apparatus 601, implements the above mentioned functionalities as defined by the method of the present disclosure. It should be noted that the computer readable medium described in the embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the embodiments of the present disclosure, the computer readable storage medium may be any physical medium containing or storing programs which may be used by a command execution system, apparatus or element or incorporated thereto. In the embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wired, optical cable, RF medium etc., or any suitable combination of the above.

The computer readable medium may be included in the above electronic device, or a stand-alone computer readable medium not assembled into the electronic device. The computer readable medium carries one or more programs. The one or more programs, when executed by the electronic device, cause the electronic device to: acquire a point cloud frame including point cloud data of a pedestrian; project the point cloud data of the pedestrian to a ground coordinate system to obtain projection point data of the pedestrian; determine a direction of a shoulder line of the pedestrian, based on a location distribution of the projection point data; extract a point cloud of a stable region from the point cloud data of the pedestrian based on the direction of the shoulder line of the pedestrian, a form change range of the stable region when the pedestrian moves being smaller than form morphological change ranges of other regions of the pedestrian; and finally determine movement information of the pedestrian based on a coordinate of a center point of the point cloud of the stable region in a plurality of consecutive point cloud frames.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor including an acquisition unit, a projection unit, a first determining unit, an extraction unit and a second determining unit. Here, the names of these units do not in some cases constitute limitations to such units themselves. For example the acquisition unit may also be described as "a unit configured to acquire a point cloud frame including point cloud data of a pedestrian".

The above description provides an explanation of certain embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for detecting a pedestrian, the method comprising:
    acquiring a point cloud frame from a laser radar in an autonomous driving vehicle;
    inputting the point cloud frame into a deep neural network to classify the point cloud frame, to acquire point data including a pedestrian;
    projecting the point cloud data of the pedestrian to a ground coordinate system to obtain projection point data of the pedestrian;
    determining a direction of a connection line between the two shoulders of the pedestrian by: down-sampling the projection point data of the pedestrian to find a straight line by fitting or iterating sampled data points obtained by the down-sampling, so that a sum or variance of a distance between the sampled data points and the straight line is minimized; and determining the straight line to be the connection line between the two shoulders of the pedestrian;
    extracting, based on the determined direction, a point cloud of a stable region of the pedestrian from the point cloud data of the pedestrian, wherein a morphological change range of the stable region when the pedestrian moves is smaller than morphological change ranges of other regions of the pedestrian;
    determining movement information of the pedestrian based on a coordinate of a center point of the point cloud of the stable region in a plurality of consecutive point cloud frames; and
    returning the movement information to the autonomous driving vehicle, such that the autonomous driving vehicle makes driving decisions based on the movement information;
    wherein the movement information comprises a movement trajectory of the pedestrian, and wherein determining the movement information of the pedestrian based on a coordinate of the center point of the point cloud of the stable region in the plurality of consecutive point cloud frames comprises:
        determining the movement trajectory by correlating the coordinate of the center point of the point cloud of the stable region in each frame of the plurality of consecutive point cloud frames and an acquisition time of this frame.

2. The method according to claim 1, wherein determining a direction of a connection line between the two shoulders of the pedestrian, based on a location distribution of the projection point data, comprises:
    determining a center point of the projection point data of the pedestrian;
    constructing a distance matrix based on a distance between each projection point and the determined center point;
    determining, based on the distance matrix, a direction having a largest variance change rate of the distance between each projection point and the determined center point, and
    determining the direction of the connection line between the two shoulders of the pedestrian, based on the determined direction having the largest variance change rate of the distance.

3. The method according to claim 2, wherein constructing a distance matrix based on a distance between each projection point and the determined center point, comprises:
    normalizing the distance between each projection point and the determined center point of the projection point data, and
    constructing the distance matrix based on the normalized distance.

4. The method according to claim 2, wherein determining the direction of the connection line between the two shoulders of the pedestrian, based on the determined direction having the largest variance change rate of the distance, comprises:
    determining the direction having the largest variance change rate of the distance between each projection point and the center point of the projection point data as a first direction, and
    determining, based on the first direction, a direction having a smallest variance change rate of the distance between each projection point and the center point of the projection point data as a second direction;
    determining, in response to determining that a difference between a variance of the distance between each projection point and the center point of the projection point data in the first direction and a variance of the distance between each projection point and the center point of the projection point data in the second direction is greater than a preset variance threshold, that the first direction is the direction of the connection line between the two shoulders of the pedestrian.

5. The method according to claim 1, wherein extracting, based on the determined direction, a point cloud of a stable region from the point cloud data of the pedestrian, comprises:
    filtering out a three-dimensional data point from the point cloud of the pedestrian to obtain the point cloud of the stable region of the pedestrian, wherein the three-dimensional data point corresponds to a projection point, a distance of which to the center point of the projection point data in the direction of the connection line between the two shoulders of the pedestrian exceeds a preset distance threshold.

6. An apparatus for detecting a pedestrian, the apparatus comprising:
at least one processor; and
a memory storing instructions, wherein the instructions when executed by the at least one processor, cause the at least one processor to perform operations, the operations comprising:
acquiring a point cloud frame from a laser radar in an autonomous driving vehicle;
inputting the point cloud frame into a deep neural network to classify the point cloud frame, to acquire point data including a pedestrian;
projecting the point cloud data of the pedestrian to a ground coordinate system to obtain projection point data of the pedestrian;
determining a direction of a connection line between the two shoulders of the pedestrian by: down-sampling the projection point data of the pedestrian to find a straight line by fitting or iterating sampled data points obtained by the down-sampling, so that a sum or variance of a distance between the sampled data points and the straight line is minimized; and determining the straight line to be the connection line between the two shoulders of the pedestrian;
extracting a point cloud of a stable region from the point cloud data of the pedestrian based on the direction of the connection line between the two shoulders of the pedestrian, a form change range of the stable region when the pedestrian moves being smaller than form change ranges of other regions of the pedestrian;
determining movement information of the pedestrian based on a coordinate of a center point of the point cloud of the stable region in a plurality of consecutive point cloud frames; and
returning the movement information to the autonomous driving vehicle, such that the autonomous driving vehicle makes driving decisions based on the movement information,
wherein the movement information comprises a movement trajectory of the pedestrian, and wherein determining the movement information of the pedestrian based on a coordinate of the center point of the point cloud of the stable region in the plurality of consecutive point cloud frames comprises:
determining the movement trajectory by correlating the coordinate of the center point of the point cloud of the stable region in each frame of the plurality of consecutive point cloud frames and an acquisition time of this frame.

7. The apparatus according to claim 6, wherein determining the direction of the connection line between the two shoulders of the pedestrian, based on the location distribution of the projection point data, comprises:
determining a center point of the projection point data of the pedestrian, and constructing a distance matrix based on a distance between each projection point and the center point of the projection point data; and
determining, based on the distance matrix, a direction having a largest variance change rate of the distance between each projection point and the center point of the projection point data, and determining the direction of the connection line between the two shoulders of the pedestrian, based on the direction having the largest variance change rate of the distance between each projection point and the center point of the projection point data.

8. The apparatus according to claim 7, wherein constructing the distance matrix based on the distance between each projection point and the determined center point, comprises:
normalizing the distance between each projection point and the center point of the projection point data, and
constructing the distance matrix based on the normalized distance.

9. The apparatus according to claim 7, wherein determining the direction of the connection line between the two shoulders of the pedestrian, based on the determined direction having the largest variance change rate of the distance, comprises:
determining the direction having the largest variance change rate of the distance between each projection point and the center point of the projection point data as a first direction,
determining, based on the first direction, a direction having a smallest variance change rate of the distance between each projection point and the center point of the projection point data as a second direction;
determining, in response to determining that a difference between a variance of the distance between each projection point and the center point of the projection point data in the first direction and a variance of the distance between each projection point and the center point of the projection point data in the second direction is greater than a preset variance threshold, that the first direction is the direction of the connection line between the two shoulders of the pedestrian.

10. The apparatus according to claim 6, wherein extracting the point cloud of the stable region from the point cloud data of the pedestrian, comprises:
filtering out a three-dimensional data point from the point cloud of the pedestrian to obtain the point cloud of the stable region of the pedestrian, wherein the three-dimensional data point corresponds to a projection point, a distance of which to the center point of the projection point data in the direction of the connection line between the two shoulders of the pedestrian exceeds a preset distance threshold.

11. A non-transitory computer readable medium, storing a computer program thereon, the program, when executed by a processor, implements operations comprising:
acquiring a point cloud frame from a laser radar in an autonomous driving vehicle;
inputting the point cloud frame into a deep neural network to classify the point cloud frame, to acquire point data including a pedestrian;
projecting the point cloud data of the pedestrian to a ground coordinate system to obtain projection point data of the pedestrian;
determining a direction of a connection line between the two shoulders of the pedestrian by: down-sampling the projection point data of the pedestrian to find a straight line by fitting or iterating sampled data points obtained by the down-sampling, so that a sum or variance of a distance between the sampled data points and the straight line is minimized; and determining the straight line to be the connection line between the two shoulders of the pedestrian;
extracting, based on the determined direction, a point cloud of a stable region of the pedestrian from the point cloud data of the pedestrian, wherein a morphological change range of the stable region when the pedestrian moves is smaller than morphological change ranges of other regions of the pedestrian;

determining movement information of the pedestrian based on a coordinate of a center point of the point cloud of the stable region in a plurality of consecutive point cloud frames; and returning the movement information to the autonomous driving vehicle, such that the autonomous driving vehicle makes driving decisions based on the movement information, wherein the movement information comprises a movement trajectory of the pedestrian, and wherein determining the movement information of the pedestrian based on the coordinate of the center point of the point cloud of the stable region in the plurality of consecutive point cloud frames comprises:

determining the movement trajectory by correlating the coordinate of the center point of the point cloud of the stable region in each frame of the plurality of consecutive point cloud frames and an acquisition time of this frame.

\* \* \* \* \*